United States Patent [19]

McMaster et al.

[11] Patent Number: 5,004,491
[45] Date of Patent: Apr. 2, 1991

[54] GLASS SHEET FORMING METHOD AND APPARATUS UTILIZING LOWER FULL SURFACE VACUUM MOLD AND UPPER RING MOLD

[75] Inventors: Ronald A. McMaster, Perrysburg; Donivan M. Shetterly, Toledo, both of Ohio

[73] Assignee: Glasstech, Inc., Perrysburg, Ohio

[21] Appl. No.: 527,144

[22] Filed: May 22, 1990

[51] Int. Cl.⁵ ............................................. C03B 23/03
[52] U.S. Cl. ...................................... 65/106; 65/104; 65/273; 65/287
[58] Field of Search ................. 65/106, 104, 273, 287, 65/289

[56] References Cited

U.S. PATENT DOCUMENTS

| | | | |
|---|---|---|---|
| 2,817,928 | 12/1957 | Lambert et al. | 65/106 |
| 3,177,060 | 4/1965 | Pedersen | 65/273 |
| 3,223,443 | 12/1965 | Misson | 54/182.2 |
| 3,778,244 | 12/1978 | Nedelec et al. | 65/106 |
| 3,782,916 | 1/1980 | Powell et al. | 65/104 |
| 4,204,854 | 5/1980 | McMaster et al. | 65/106 |
| 4,233,049 | 11/1980 | Seymour | 65/106 |
| 4,282,026 | 8/1981 | McMaster et al. | 65/273 |
| 4,575,390 | 3/1986 | McMaster | 65/273 |
| 4,578,103 | 3/1986 | Fackelman | 65/182.2 |
| 4,609,391 | 9/1986 | McMaster | 65/104 |
| 4,615,724 | 10/1986 | Fackelman | 65/182.2 |
| 4,661,141 | 4/1987 | Nitschke et al. | 65/273 |
| 4,711,653 | 12/1987 | Frank et al. | 65/106 |
| 4,746,348 | 5/1988 | Frank | 65/104 |
| 4,840,657 | 6/1989 | Orain | 65/106 |
| 4,859,225 | 8/1989 | Kuster et al. | 65/104 |

Primary Examiner—Joye L. Woodard
Attorney, Agent, or Firm—Brooks & Kushman

[57] ABSTRACT

Apparatus (38) and a method for forming a flat glass sheet is disclosed as utilizing a heating conveyor (42) that transfers a heated flat glass sheet to a downwardly facing surface (46) of a topside transfer device (44), a lower mold (48) having an upwardly facing full surface (50) at least a portion of which has an upwardly convex shape that receives the heated flat glass sheet from the topside transfer device, and an upper ring mold (52) that forms and seals the periphery of the heated glass sheet against the vacuum mold surface (50) at which a vacuum is supplied within the sealed periphery of the glass sheet to form the entire extent of the glass sheet to the vacuum mold surface. A vacuum is then provided within a vacuum chamber (122) of the upper ring mold (52) to receive the formed glass sheet from the lower vacuum mold for support by the upper ring mold. A cooling mold (132) which may either be an annealing ring (132a) or a quench ring (132b) is also preferably provided to receive the formed glass sheet from the upper ring mold (52) for cooling in order to provide either annealing or tempering of the formed glass sheet.

21 Claims, 8 Drawing Sheets

GLASS SHEET FORMING METHOD AND APPARATUS UTILIZING LOWER FULL SURFACE VACUUM MOLD AND UPPER RING MOLD

TECHNICAL FIELD

This invention relates to apparatus and a method for forming a flat glass sheet.

BACKGROUND ART

Formed glass sheets are used extensively for vehicle windshields, side windows, and rear windows. To improve the mechanical strength of the glass, the formed glass sheets are also conventionally tempered which causes the glass to break into relatively small, dull pieces rather than into relatively long, sharp shards. In the United States, tempered formed glass sheets are used on vehicle side and rear windows while annealed formed glass sheets laminated to each other by polyvinyl butyral are used for vehicle windshields. In other countries, tempered formed glass sheets are used for vehicle windshields as well as side and rear windows.

One prior art glass sheet forming system disclosed by U.S. Pat. No. 3,782,816 Powell et al includes a heating conveyor on which a glass sheet is heated prior to conveyance to a bending station where the heated glass sheet is received by rollers of an upwardly facing convex mold surface on a rotatable mold carrying member. Downward retraction of the rollers into the mold surface and subsequent pressing of the heated flat glass sheet between the upwardly facing surface and a downwardly facing surface on an upper mold forms the glass sheet prior to rotation of the mold carrying member and release of the formed glass sheet chilling by an oil bath that toughens or tempers the glass sheet.

Another prior art forming system disclosed by U.S. Pat. No. 3,778,244 Nedelec et al includes a heating conveyor that conveys a flat glass sheet during heating and delivers the heated glass sheet to a bending station which includes a vertically movable upper mold having a downwardly facing surface of a curved shape against which the heated glass sheet is received from the heating conveyor for pneumatic forming. Upward movement of the upper mold then permits a lower mold with a curved surface to move below the upper mold. In one embodiment, the upper mold has a downwardly concave shape and the lower mold has an upwardly convex shape that receives the previously formed glass sheet from the upper mold and thereafter transfers the formed glass sheet from below the upper mold to a cooling and conditioning chamber. In another embodiment, the upper mold has a downwardly convex shape and the lower mold has an upwardly concave shape for receiving the heated glass sheet from the upper mold.

U.S. Pat. Nos. 4,204,854 McMaster et al; 4,282,026 McMaster et al; 4,233,049 Seymour; 4,575,390 McMaster; and 4,609,391 McMaster disclose glass sheet forming systems wherein a holder has a downwardly facing surface that receives a heated glass sheet from a heating conveyor and then transfers the heated glass sheet to a lower mold of an upwardly concave shape for forming under gravity.

The above mentioned prior art references and U.S. Pat. Nos. 4,661,141 Nitschke et al; 4,711,653 Frank et al; 4,746,348 Frank et al; and 4,859,225 Kuster et al disclose pressing and vacuum forming of glass sheets between upper and lower molds.

U.S. Pat. Nos. 4,578,103 and 4,615,724 of Fackelman each disclose a glass sheet forming system which includes a topside transfer apparatus including a fused silica block having a downwardly facing flat surface at which a vacuum is drawn through a first set of holes and at which pressurized gas is supplied through a second set of holes in order to support a heated glass sheet without any direct contact. The topside transfer apparatus receives a heated glass sheet from a heating conveyor and subsequently releases the heated glass sheet onto a lower mold which is specifically disclosed as having an upwardly concave shape. Another experimental glass sheet topside support device is disclosed by U.S. Pat. No. 3,223,443 Misson and includes inverted cup-shaped members that are spaced from each other to provide both pressurized gas and a vacuum that cooperatively support a glass sheet without any engagement.

DISCLOSURE OF INVENTION

An object of the present invention is to provide improved apparatus and a method for forming a flat glass sheet in a manner that is capable of providing accurately formed glass sheets.

In carrying out the above and other objects of the invention, the apparatus is disclosed as including a heating conveyor for heating a flat glass sheet to a sufficiently high temperature to permit forming of the glass sheet. An upper topside transfer device of the apparatus receives the heated glass sheet from the heating conveyor. A lower vacuum mold of the apparatus has an upwardly facing full surface with at least a portion thereof having an upwardly convex shape for receiving the heated flat glass sheet from the downwardly facing surface of the topside transfer apparatus. An upper ring mold of the apparatus forms and seals the periphery of the heated glass sheet against the surface of the lower vacuum mold at which a vacuum is drawn within the sealed periphery of the glass sheet to fully form the glass sheet to the shape of the vacuum mold surface. The upper ring mold includes an enclosure defining a chamber in which a vacuum is drawn to permit the upper ring mold to lift the formed glass sheet upwardly from the lower vacuum mold after the vacuum actuated forming.

In the preferred construction disclosed, the heating conveyor is either a gas hearth conveyor that supports the flat glass sheet on a thin film of gas during the heating or a roller conveyor including rollers that rotate to transport and convey the flat glass sheet during the heating.

The preferred construction of the apparatus has the topside transfer apparatus provided as either a gas suspension platen for supporting the heated flat glass sheet received from the heating conveyor without any direct engagement therewith or a vacuum platen for supporting the heated flat glass sheet received from the conveyor in direct engagement with the glass sheet.

In one embodiment, a shape retention pad of the upper ring mold is located within the vacuum chamber and prevents excessive upward forming of the glass sheet by the vacuum drawn within the enclosure. In another embodiment, the upper ring mold has an open center into which the glass sheet is formed upwardly a controlled extent by the vacuum drawn within the chamber defined by the enclosure of the upper ring mold. The actual shape of the glass sheet to be formed controls which embodiment will function most effectively. It should be noted that with both of these embodiments, the lower vacuum mold does not have to be compensated for subsequent center sagging of the glass sheet since that compensation is provided by the extent of the upward forming of the glass sheet by the vacuum supplied to the upper ring mold.

In its preferred construction, the apparatus also includes an actuator that provides relative movement between the upper ring mold and the lower vacuum mold with respect to each other preferably by moving the upper ring mold vertically toward and away from the lower vacuum mold. This actuator initially moves the upper ring mold and the lower vacuum mold toward each other to seal the periphery of the glass sheet with the full surface lower vacuum mold. For more simple shapes having only straight line elements, such as cylindrical and conical shapes, the vacuum forming of the glass sheet can proceed with the molds pressed against each other. For more complex shapes, the actuator moves the upper ring mold and lower vacuum mold away from each other to space the upper ring mold from the sealed periphery of the glass sheet so as to thereby permit movement of the glass sheet along the extent of the full surface of the lower vacuum mold during the vacuum actuated forming.

As disclosed, the apparatus also further includes a cooling mold for receiving the formed glass sheet for cooling. This cooling mold is disclosed in one embodiment as an annealing ring that receives the formed glass sheet for cooling at a sufficiently slow rate to prevent excessive stresses in the glass sheet upon cooling to ambient temperature. In one modification of the annealing embodiment, the forming apparatus includes a common actuator that moves the lower vacuum mold and the annealing ring horizontally for alternate positioning below the upper ring mold. In another modification of the annealing embodiment, a plurality of the annealing rings are provided and a recirculating conveyor cyclically moves the annealing rings to the upper mold to receive each formed glass sheet therefrom during cyclical operation of the apparatus. In another embodiment, the cooling mold is a quench ring and the apparatus further includes a quench station including upper and lower blastheads between which the quench ring moves the formed glass sheet for rapid cooling by quenching gas flow from the blastheads to temper the formed glass sheet.

Another object of the invention is to provide an improved method for forming a flat glass sheet by heating the flat glass sheet to a sufficiently high temperature for forming and then transferring the heated glass sheet to a downwardly facing surface of a topside transfer device from which it is released onto a full surface mold of a lower vacuum mold having at least a portion with an upwardly convex shape. Thereafter, the glass sheet is pressed between the lower vacuum mold and an upper ring mold to form and seal the periphery of the glass sheet against the lower vacuum mold surface. A vacuum is drawn at the vacuum mold surface within the sealed periphery of the glass sheet to form the entire extent of the glass sheet to the shape of the vacuum mold surface, and a vacuum is then drawn within an enclosure of the upper ring mold such that the upper ring mold receives and delivers the formed glass sheet from the vacuum mold for cooling.

In practicing the glass sheet forming method, two different modes of operation are possible as previously mentioned in connection with the apparatus. For more easily formed shapes including straight line elements such as cylindrical and conical shapes, the molds may remain in a pressing relationship with the glass sheet as the vacuum is drawn at the lower vacuum mold surface to fully form the glass sheet to the shape of the vacuum mold surface. For more complicated shapes including cross-curvatures where the glass is curved in perpendicular directions to each other, inverse curves having the centers of the curvature on both sides of the glass sheet, and abruptly curved shapes, the molds are moved away from each other as the vacuum is drawn at the lower vacuum mold surface to fully form the glass sheet to the shape of the vacuum mold surface.

In the preferred practice of the method, the upper ring mold is moved downwardly to press the glass sheet between the molds. Subsequent to the vacuum forming of the glass sheet on the vacuum mold, a vacuum is drawn at the upper ring mold to support the formed glass sheet and the upper ring mold is moved upwardly away from the lower vacuum mold prior to the formed glass sheet being released from the upper ring mold onto a cooling mold for cooling. This release of the glass sheet may be onto a cooling mold embodied by either an annealing ring or a tempering ring.

The objects, features and advantages of the present invention are readily apparent from the following detailed description of the best modes for carrying out the invention when considered with the accompanying drawings.

BEST MODES FOR CARRYING OUT THE INVENTION

Figure 1:
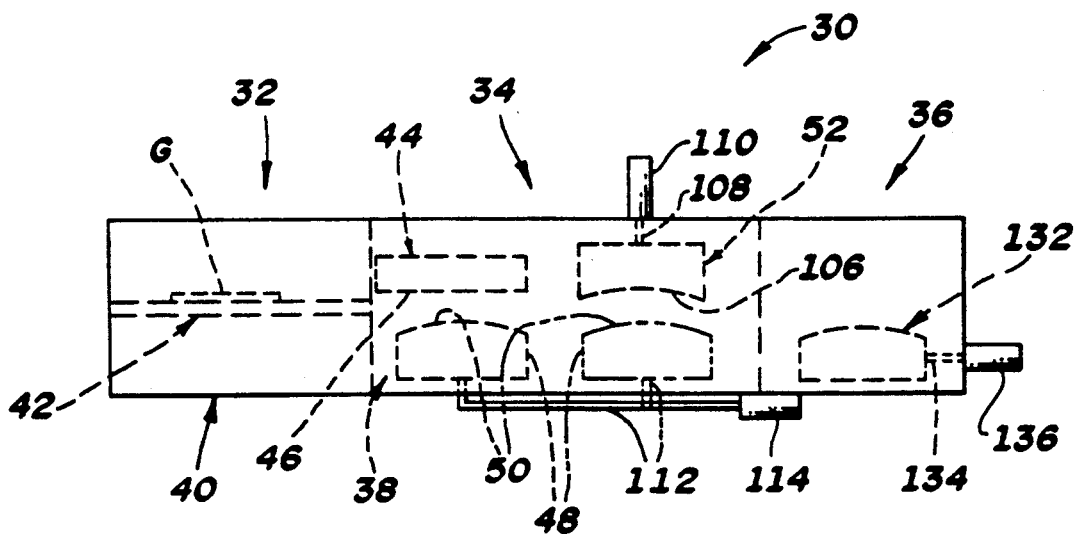
FIG. 1 is a side schematic view of a glass forming system including apparatus for forming a flat glass sheet in accordance with the present invention.

With reference to FIG. 1 of the drawings, a glass sheet forming system generally indicated by 30 is disclosed as including a heating station 32, a forming station 34, and a cooling station 36. This system can be constructed to provide accurately formed annealed glass sheets for which it has particular utility as is hereinafter more fully described; but it should be appreciated that the system can also be used to form tempered glass sheets as is also hereinafter more fully described.

With continuing reference to FIG. 1, forming apparatus of the system is constructed in accordance with the present invention and is collectively indicated by 38. This forming apparatus 38 is utilized to provide the glass sheet forming method of the invention as is hereinafter more fully described. The forming system 30 has its heating station 32 provided with a furnace 40 whose generally enclosed interior heating chamber includes a heating conveyor 42 for heating the flat glass sheet G to a sufficiently high temperature to permit forming of the glass sheet. An upper topside transfer device 44 of the apparatus has a flat surface 46 that faces downwardly to receive the heated flat glass sheet from the heating conveyor 42 in preparation for forming of the glass sheet. A lower vacuum mold 48 of the forming apparatus has an upwardly facing full surface 50 for receiving the heated flat glass sheet from the topside transfer device 44 for forming. The full surface 50 of the lower vacuum mold 48 has at least a portion with an upwardly convex shape to which the glass sheet is formed. Forming apparatus 38 also includes an upper ring mold 52 for forming and sealing the periphery of the heated glass sheet against the surface 50 of the lower vacuum mold 48 at which a vacuum is drawn within the sealed periphery of the glass sheet, as in hereinafter more fully described, to fully form the glass sheet to the shape of the vacuum mold surface.

Figure 2:
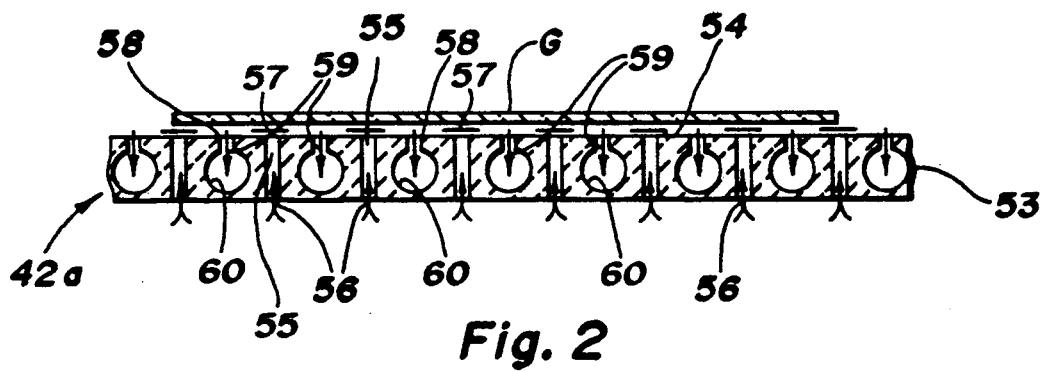
FIG. 2 is a sectional view through one embodiment of a heating conveyor of the apparatus wherein the heating conveyor is of the gas hearth type for supporting the glass sheet being heated on a thin film of gas.
Figure 3:
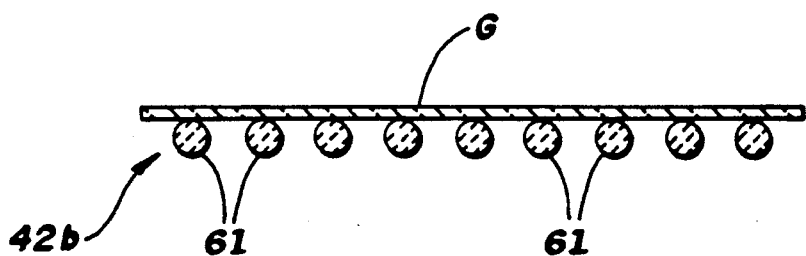
FIG. 3 is a sectional view through another embodiment wherein the heating conveyor is of the roller type including rollers for supporting the glass sheet during heating.

With reference to FIGS. 2 and 3, two different embodiments of the heating conveyor 42 illustrated in FIG. 1 are specifically shown. As shown in FIG. 2, one embodiment of the heating conveyor 42a includes a gas hearth 53 that is preferably made from fused silica and has an upwardly facing flat surface 54 with one set of holes 55 that supply pressurized gas from a lower plenum as shown by arrows 56 to provide a thin gas film schematically illustrated by lines 57. Another set of holes 58 in the hearth surface 54 exhausts the gas as shown by arrows 59 to exhaust tunnels 60. Such gas hearth conveyors are conventionally slightly tilted transverse to the direction of conveyance and have a suitable frame at the lower tilted edge for moving the glass sheet along the conveyor for heating. As illustrated in FIG. 3, another embodiment of the heating conveyor is a roller conveyor 42b including rollers 61 that rotate to transport and convey the flat glass sheet G during the heating. These rollers 61 are preferably made from sinter bonded fused silica particles so as to have good resistance to thermal warpage.

Figure 4:
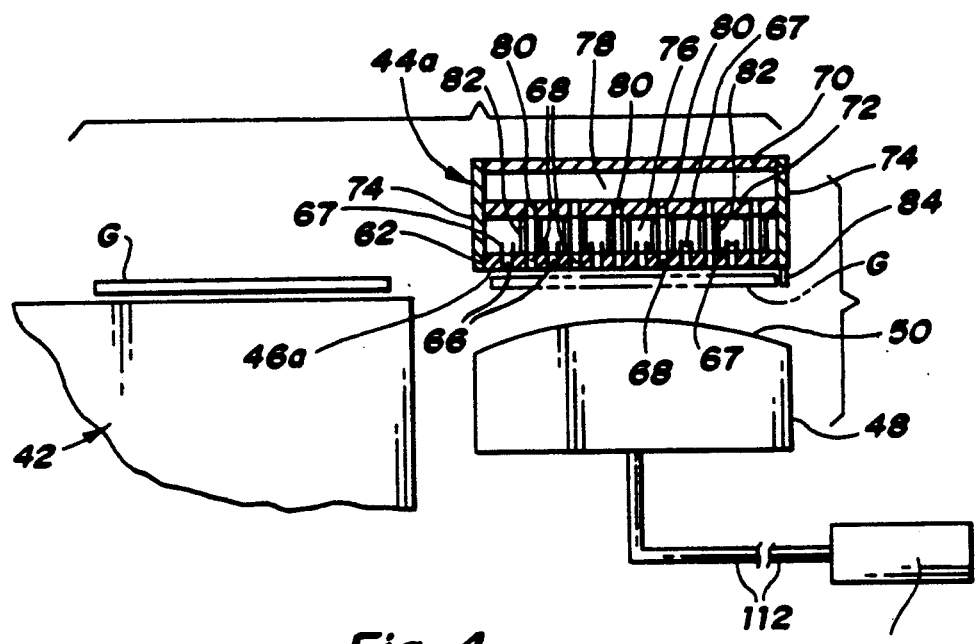
FIG. 4 is a partial view of the apparatus illustrating one embodiment of a topside transfer device including a gas suspension platen for supporting the heated flat glass sheet without direct engagement.
Figure 5:
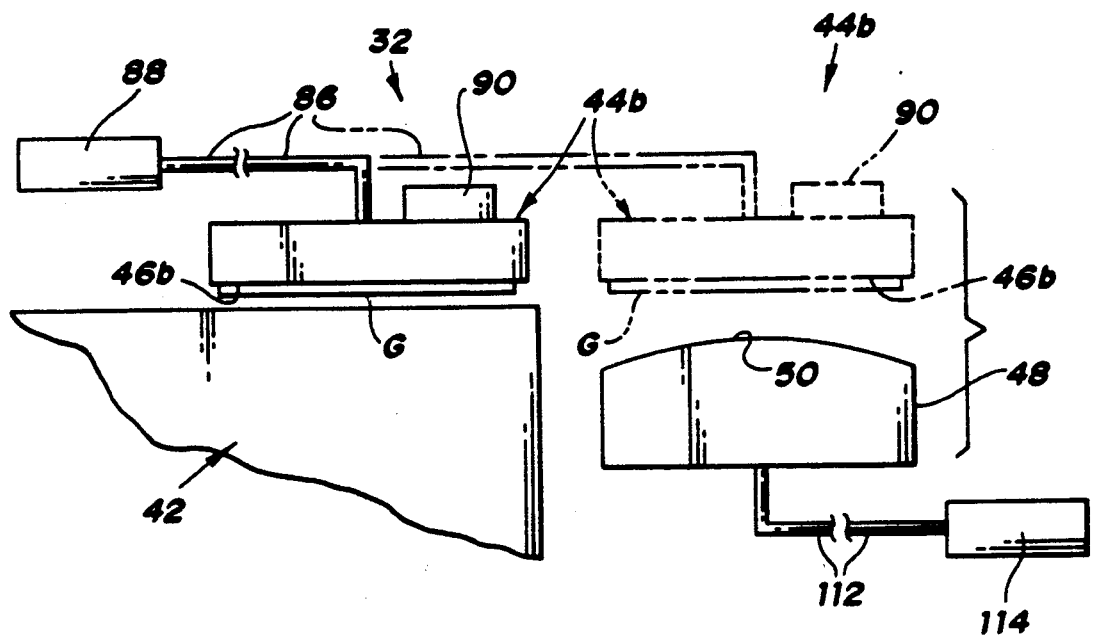
FIG. 5 is a partial view of the apparatus illustrating another embodiment of the topside transfer device which includes a vacuum platen for supporting the heated flat glass sheet received from the heating conveyor in direct engagement.

As illustrated in FIGS. 4 and 5, two different embodiments of the topside transfer device 44 illustrated in FIG. 1 are shown. More specifically, the FIG. 4 embodiment of the topside transfer device is a gas suspension platen 44a for supporting the heated flat glass sheet received from the heating conveyor 42 by vacuum and pressurized gas without any direct engagement therewith as is hereinafter more fully described. In the embodiment of the FIG. 5, the topside transfer device is embodied by a vacuum plane 44b for supporting the heated flat glass sheet received from the heating conveyor 42 in direct engagement therewith as is also more fully hereinafter described. When the roller embodiment of the heating conveyor as illustrated in FIG. 3 is utilized with either the FIG. 4 or 5 embodiment of the topside transfer apparatus, upward gas flow between the rollers can also be used to assist the vacuum in raising the glass sheet G from the heating conveyor for support by the platen.

With specific reference to FIG. 4, the gas suspension platen 44a includes an apertured lower plate 62 having a lower flat surface 46a including a first set of openings 66 through which positive pressure gas is supplied. As illustrated, tubes 67 which may be embodied by roll pins project upwardly from the openings 66 to provide conduits through which the pressurized gas is supplied as jets. A second set of openings 68 in the lower plate 62 supplies a vacuum to the lower surface 46a so as to cooperate with the pressurized gas n supporting the lower glass sheet in a spaced relationship the lower glass sheet in a spaced relationship without any direct engagement with the surface. An upper housing member 70, an apertured intermediate plate 72, and side housing plates 74 of the gas suspension platen 44a define a plenum 76 to which positive pressure gas is supplied to feed the pressurized gas through the first of holes 66 in the lower plate 62 and also cooperate to define a vacuum chamber 78 at which a vacuum is drawn and fed through a set of openings 80 in the intermediate plate 72 and through spaced tubes 82 to the second set of openings 68 in the lower plate 62. The pressurized gas and vacuum supplied to the downwardly facing flat surface 46a of the gas suspension platen 44a thus cooperate to support the heated glass sheet without any direct engagement. A suitable positioner 84 on the platen surface 46a as shown or a positioner mounted by the lower vacuum mold 48 may be utilized to locate the heated glass sheet G on the platen surface 46a so as to be in proper alignment with the lower vacuum mold in preparation for the bending operation. The lower surface 46a may be inclined downwardly in a downstream direction toward the right to facilitate the glass sheet conveyance from the heating conveyor onto the topside transfer device to the necessary location in preparation for the forming.

With reference to FIG. 5, the vacuum platen embodiment 44b of the topside transfer device has a connection 86 to an actuator 88 that moves the vacuum platen from just above the delivery end of the heating conveyor 42 as shown by solid line representation to above the lower mold 48 as shown by phantom line representation. A gas jet pump 90 on the vacuum platen 44b draws a vacuum at spaced holes in a downwardly facing flat surface 46b of the vacuum platen so as to lift the heated glass sheet G from the heating conveyor 42. The gas jet pump 90 can also be operated so as to reduce the extent of vacuum drawn after the initial lifting operation so as not to deform the heated glass sheet at the spaced holes in the downwardly facing surface 46b of the vacuum platen. After from above the heating conveyor 42 to above the lower vacuum mold 48 as shown by phantom line representation. The vacuum drawn by the gas jet pump is then terminated so as to release the glass sheet, and positive pressure gas is most preferably provided to the spaced holes in the vacuum platen at its downwardly facing surface 46bso as to force the glass sheet downwardly away from the vacuum platen and onto the lower vacuum mold 48.

Figure 6:
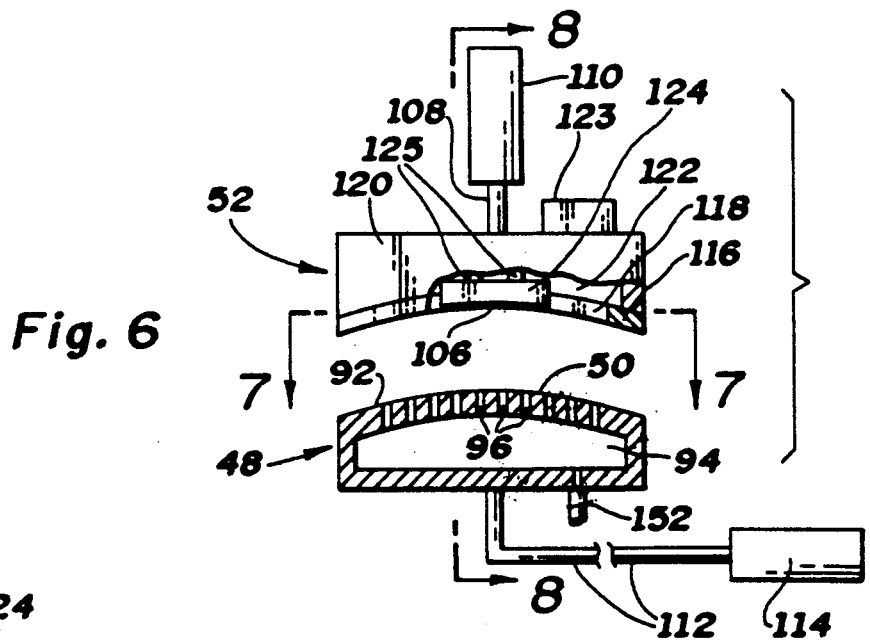
FIG. 6 is a partial view of another portion of the forming apparatus which includes a lower vacuum mold having an upwardly convex shape of the full surface type including openings through which a vacuum is drawn to form the glass sheet, and which also includes an upper mold of the ring type for cooperating with the lower mold to form the glass sheet.
Figure 7:
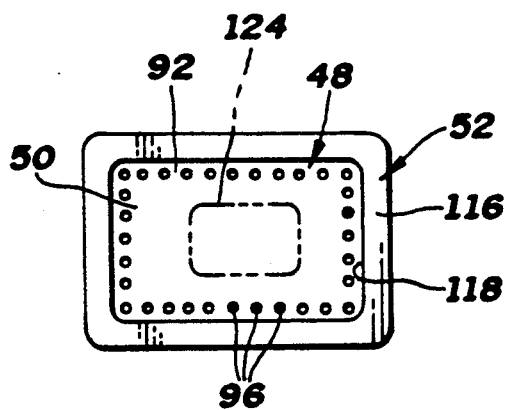
FIG. 7 is a view taken along the direction of line 7—7 in FIG. 6 to illustrate the hole pattern of the full surface lower vacuum mold.

As shown in FIG. 6, the full surface 50 of the lower vacuum mold 48 has its upwardly convex portion identified by 92, and the lower vacuum mold also has a vacuum chamber 94 that is communicated by openings 96 with the surface 50 to perform the vacuum forming. The openings 96 as illustrated in FIG. 7 extend generally about the periphery of the shape of the glass sheet to be formed just inward from the ring mold 52. Drawing of the vacuum through the mold openings 96 is most preferably performed by a vacuum system 98 illustrated in FIG. 9. Some configurations to be bent such as the S shape shown in FIG. 8 have an inversely curved portion 100 that is slightly concave in an upward direction despite the generally upwardly convex configuration of the lower mold surface 50. Furthermore, to the right of the inversely curved portion 100 shown in FIG. 8, the mold surface 50 is illustrated as having an upwardly convex portion 102 that represents cross curvature with respect to the upwardly convex curvature of surface 50 illustrated in FIG. 6. Such complex glass sheet forming can be achieved with the bending apparatus herein disclosed in a manner that has not been heretofore possible.

With reference to FIG. 1, the upper ring mold 52 has a downwardly concave shape 106 and a connection 108 to an actuator 110. Operation of the actuator 110 provides vertical movement of the upper ring mold 52. Also, as shown in FIG. 1, the lower vacuum mold 48 has a connection 112 to an actuator 114 for providing movement thereof from a first position shown by dash line representation below the topside transfer device 44 where the glass sheet is received to a second position shown by phantom line representation below the upper ring mold 52. Operation of the upper mold actuator 110 provides vertical movement of the upper ring mold 52 in order to provide relative vertical movement between the lower and upper molds 48 and 52.

The upper ring mold 52 shown in FIG. 6 includes a ring 116 that defines the downwardly concave shape 106 and corresponds to the periphery of the glass sheet to be formed. The mold ring 116 as shown in FIG. 7 has an open center 118 such that the only contact with the glass sheet during the initial forming is at the periphery of the glass sheet. The upper ring mold 52 also includes an enclosure 120 defining a chamber 122 in which a vacuum is drawn such as by a fan at a remote location or a gas jet pump 123 mounted on the enclosure. This vacuum permits the upper ring mold 52 to lift the formed glass sheet upwardly from the lower vacuum mold 48 after the vacuum forming hereinafter more fully described.

Different embodiments of the upper ring mold can be utilized. With the embodiment of the upper ring mold 52 illustrated in FIG. 6 through 8, a shape retention pad 124 is located within the vacuum chamber 122 and prevents the vacuum drawn from performing excessive upward forming of the glass sheet to an undesired shape. This shape retention pad 124 is mounted on the upper ring mold 52 by adjustable supports 125 as shown in FIG. 6 so as to provide adjustment thereof with respect to the concave mold shape 106. In another embodiment illustrated by FIG. 22, the upper ring mold 52' has an open center 118 without any shape retention pad such that the glass sheet can be formed upwardly a controlled extent that is determined by the extent of vacuum drawn and the time during which the glass sheet is supported by the upper ring mold. It has been found that some glass shapes can be more easily formed by utilizing the embodiment of FIGS. 6 through 8 with the shape retention pad 124 while other shapes can be more easily formed by utilizing the open center version of FIG. 22. However, with both of these embodiments, the lower vacuum mold 48 does not have to be compensated for subsequent center sag which facilitates the tooling required for the forming apparatus.

Figure 10:
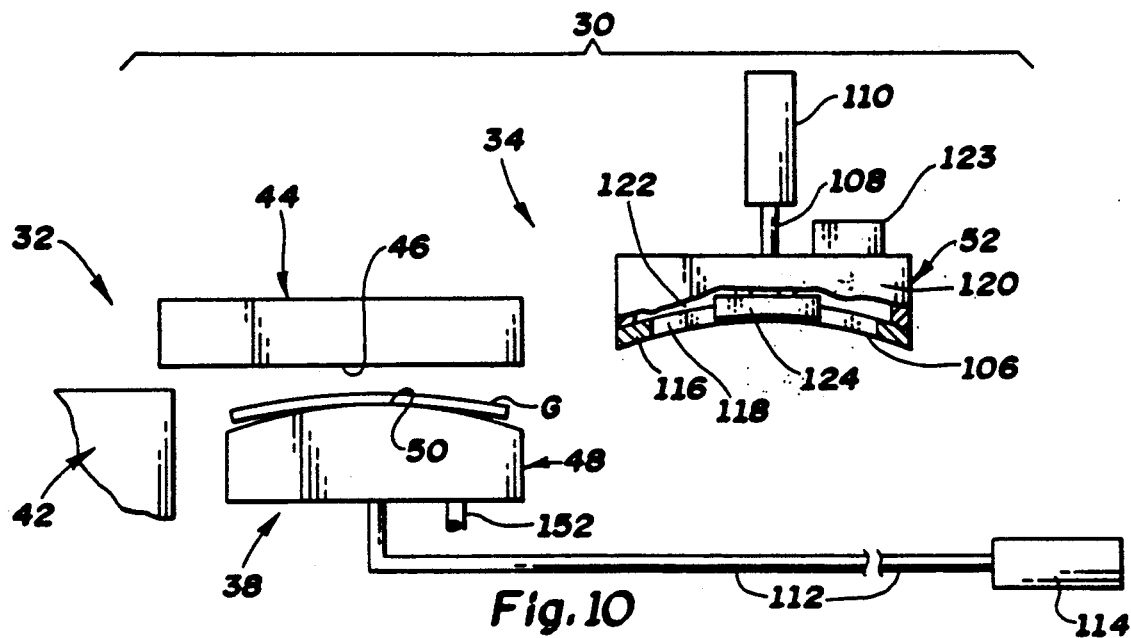
FIG. 10 is a view of the forming apparatus which illustrates the flat glass sheet just after it has been released from the topside transfer device onto the lower vacuum mold for forming.
Figure 11:
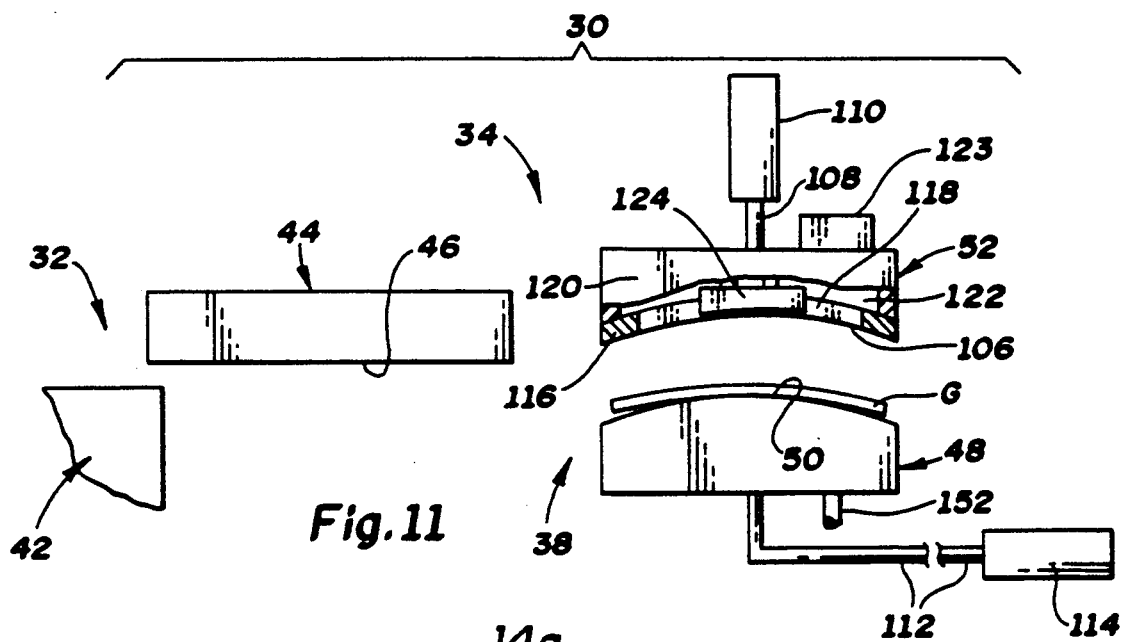
FIG. 11 illustrates the forming apparatus at a further stage after the lower vacuum mold has been moved from the position of FIG. 10 below the topside transfer device to a location below the upper ring mold.
Figure 12:
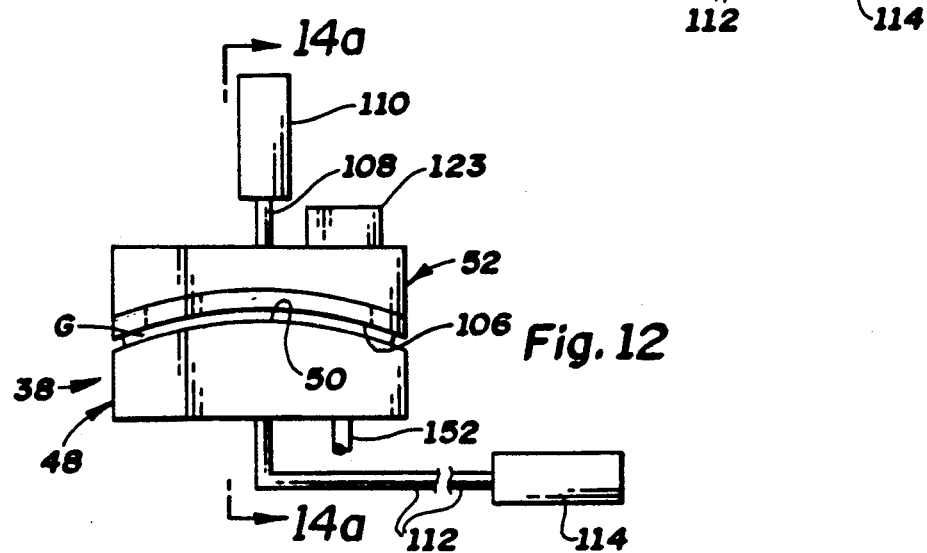
FIG. 12 is a view of the forming apparatus at a still further stage after the molds have been moved toward each other, preferably by downward movement of the upper ring mold, to seal the periphery of the glass sheet to the full surface of the lower vacuum mold.
Figure 13:
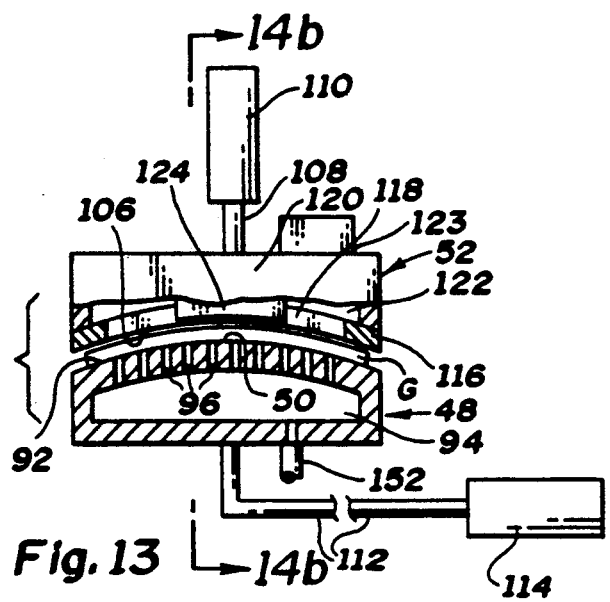
FIG. 13 is a view illustrating a still further stage where the upper ring mold has been moved slightly away from the full surface of the lower vacuum mold to permit vacuum forming of more complex shapes of the glass sheet at the full surface of the lower vacuum mold.
Figure 14A:
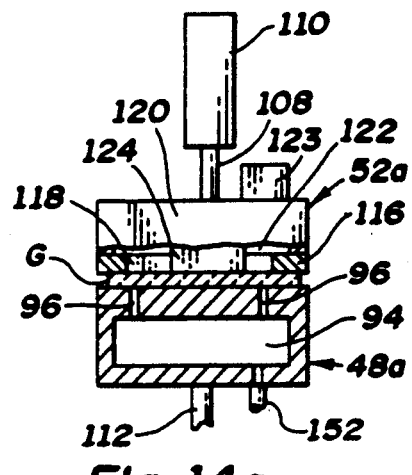
FIG. 14a is a sectional view taken along the direction of line 14a—14a of FIG. 12 to illustrate the vacuum forming when performed with the molds in continued pressing relationship with the glass sheet.
Figure 14B:
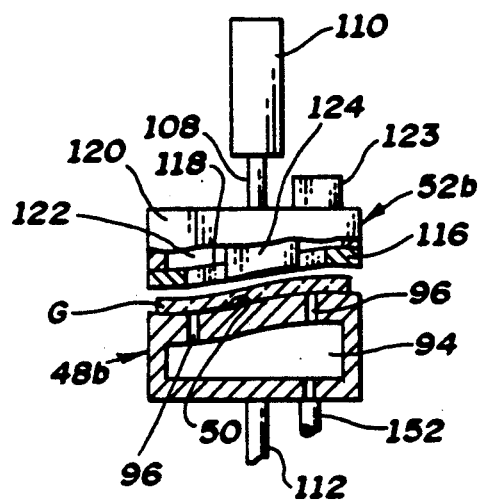
FIG. 14b is a sectional view taken along the direction of line 14b—14b in FIG. 13 to illustrate the vacuum forming when performed after the molds are moved out of the pressing relationship with the glass sheet to form a shape with inverse curvatures.
Figure 14C:
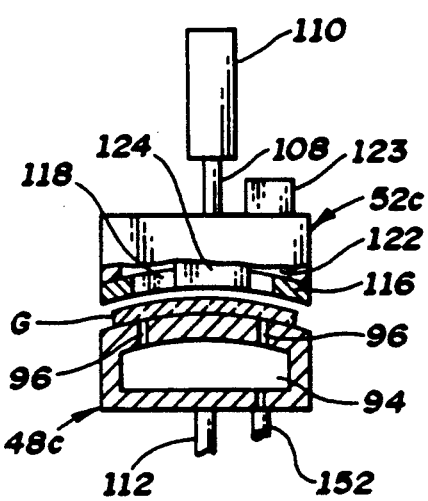
FIG. 14c is a sectional view taken in the same direction as FIG. 14b to illustrate the vacuum forming when performed after the molds are moved out of the pressing relationship with the glass sheet to form a shape with a cross-curvature.
Figure 15:
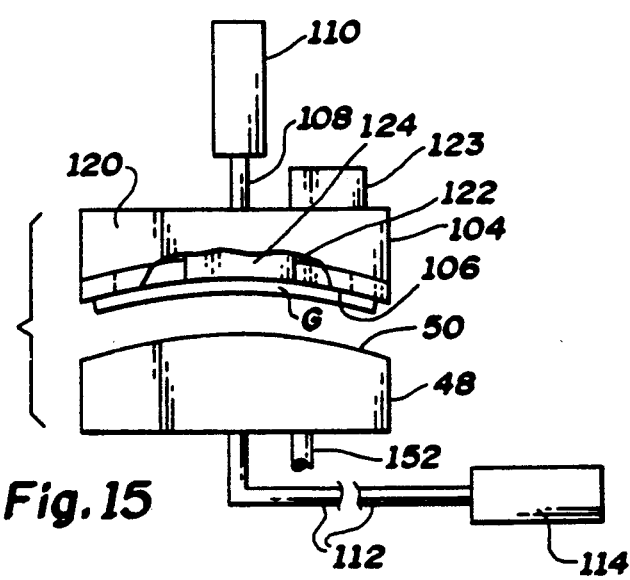
FIG. 15 is a view illustrating the formed glass sheet after upward movement thereof on the upper ring mold away from the lower vacuum mold.

With reference to FIG. 10, the glass forming cycle proceeds as the topside transfer device 44 releases the heated flat glass sheet G from its downwardly facing surface 46 onto the lower vacuum mold 48. Of course, this topside transfer device 44 may be of either the air suspension type illustrated in FIG. 4 or of the vacuum platen type illustrated in FIG. 5 as previously described. After being received by the lower vacuum mold 48, the glass sheet G begins to form under gravity to the shape of the mold as its ends bend downwardly. The lower mold 48 is then moved through its connection 112 by the actuator 114 from the position of FIG. 10 below the topside transfer device 44 to the position of FIG. 11 below the upper vacuum mold 52. Actuator 110 through its connection 108 then moves the upper ring mold 52 downwardly to thereby move the upper and lower molds toward each other in order to seal the periphery of the glass sheet G with the surface 50 of the lower vacuum mold. With some more simple glass shape including only straight line elements such as cylindrical and conical bends, the vacuum forming on the lower vacuum mold 48 can proceed with the glass sheet pressed between the lower and upper molds as shown in FIG. 14a. However, for more complicated shapes including inverse curves and cross-curvatures as respectively illustrated in FIGS. 14b and 14c, it is desirable for the actuator 110 to move the upper ring mold 52 upwardly a slight extent in order to slightly space the upper and lower molds from each other as illustrated in FIG. 13. This spacing allows the glass sheet to move along the extent of the mold surface during the vacuum actuated forming.

The forming cycle may proceed in two different ways from the position illustrated in FIG. 13. In one mode, the formed glass sheet is blown upwardly as is hereinafter described, and a vacuum drawn within the vacuum chamber 122 of the upper ring mold 52 then supports the formed glass sheet. In another mode, the upper ring mold 52 either remains in engagement with the periphery of the glass sheet during the vacuum forming or is moved downwardly by the actuator 110 to engage the periphery of the formed glass sheet. In either case, termination of the vacuum at the lower vacuum mold 48 and provision of a vacuum within the vacuum chamber 122 transfers the formed glass sheet from the lower vacuum mold to the upper ring mold. Thereafter, the upper ring mold 52 is moved upwardly in each mode by the actuator 110 so that the lower vacuum mold 48 is free to move from below the upper ring mold 52 back to the position below the topside transfer device 44 as illustrated by dash lined representation in FIG. 1.

Figure 16:
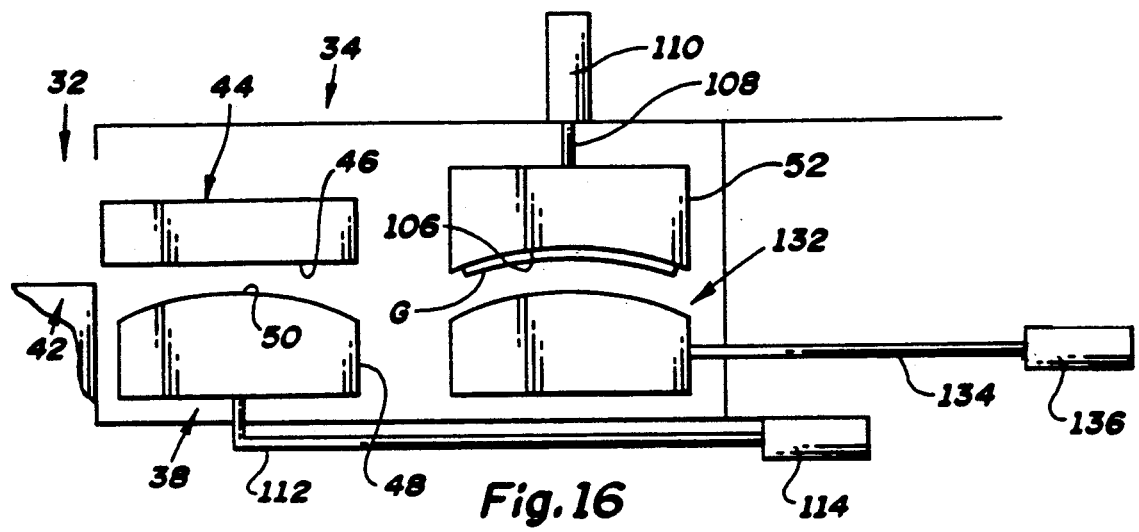
FIG. 16 is a view that illustrates a further stage of the forming wherein the lower vacuum mold has been moved back to below the topside transfer apparatus and a cooling mold has been moved to below the formed glass sheet on the upper ring mold.
Figure 17:
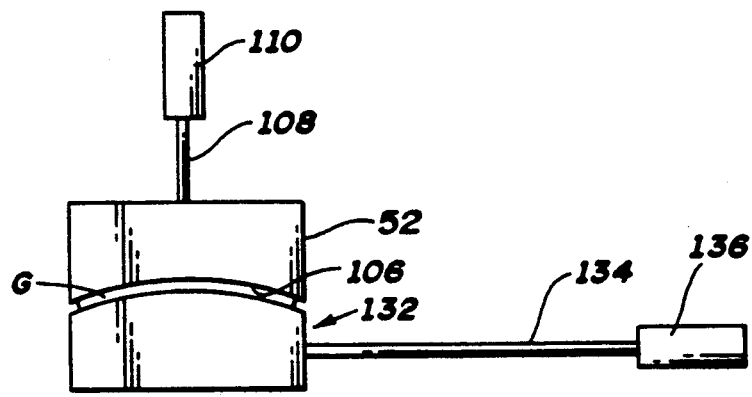
FIG. 17 is a view that illustrates at a further stage where downward movement of the upper ring mold delivers the formed glass sheet to the cooling mold.
Figure 18:
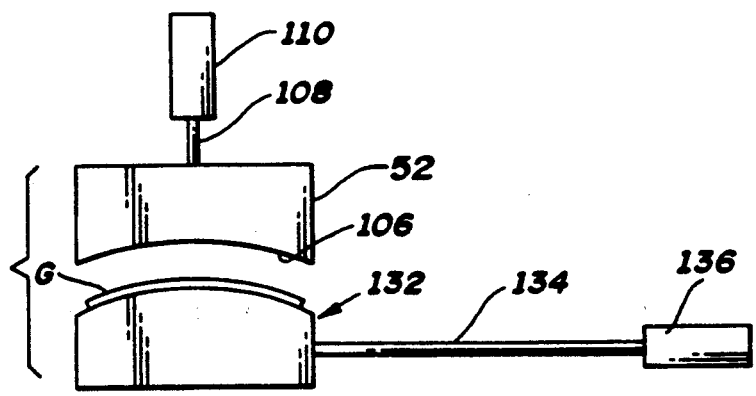
FIG. 18 is a view that illustrates a still further stage where the upper ring mold has been moved upwardly away from the lower cooling mold.

With continuing reference to FIG. 1, the forming apparatus 38 also is disclosed as including a cooling mold 132 for receiving the formed glass sheet from the upper ring mold 52 for cooling. This cooling mold 132 has a connection 134 to an actuator 136 for providing movement thereof from the cooling station 36 as illustrated in FIG. 1 to below the upper ring mold 52 of the bending station 34 as illustrated in FIG. 16. Downward movement of the upper ring mold 52 with the formed glass sheet G thereon from the position of FIG. 16 to the position of FIG. 17 allows the upper ring mold 52 to deposit the glass sheet onto the cooling mold 132. Release of the vacuum drawn at the upper ring mold 52 and subsequent upward movement of the upper ring mold as illustrated in FIG. 18 deposits the formed glass sheet onto the cooling mold 132 and the actuator 136 then moves the cooling mold back to the cooling station 36 as illustrated in FIG. 1.

Figure 8:
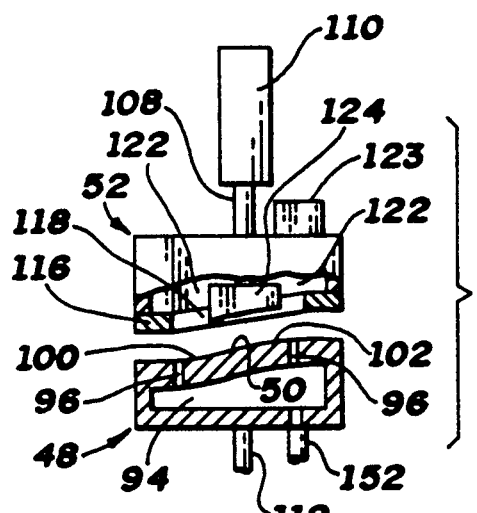
FIG. 8 is a sectional view taken along the direction of line 8—8 in FIG. 6 through both the lower vacuum mold and the upper ring mold.
Figure 22:
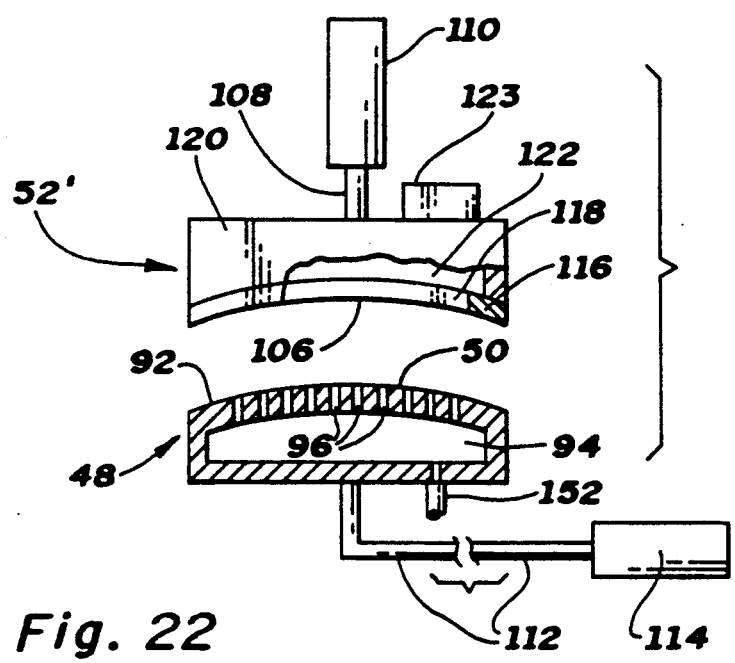
FIG. 22 is a view similar to FIG. 6 illustrating a modification where the upper ring mold has an open center into which the glass sheet is formed a control extent to provide center sag compensation.

During the entirety of the support of the formed glass sheet by the upper ring mold 52, the shape retention pad 124 of the embodiment of FIGS. 6–8 or controlling the vacuum drawn within the open center 118 of the mold ring 116 of the embodiment of FIG. 22 prevents excessive upward forming of the center of the glass sheet by the vacuum drawn within the vacuum chamber 122. Since the center of the formed glass sheet can sag downwardly a certain extent when the cooling mold 132 is of the ring type as is hereinafter described, the shape retention pad 124 can be adjusted by the positioners 125 (FIG. 6) so as to be located slightly upward from the desired final glass sheet center location and thereby accommodate for the subsequent center sag in order to provide a finally formed glass sheet with the desired shape. Likewise, the extent of the vacuum drawn and the time period during which the glass sheet is supported by the open center embodiment of the upper ring mold 52' in FIG. 22 also can be controlled to accommodate for subsequent center sag in order to provide a finally formed glass sheet with the desired shape. As previously mentioned, both of these ways of controlling the final shape are accomplished with the lower vacuum mold 48 having its surface 92 with the final glass shape without any center sag compensation in order to facilitate tooling manufacturing.

Figure 19:
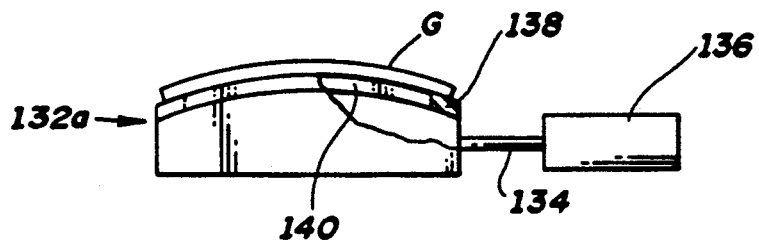
FIG. 19 is a view that illustrates one embodiment of the lower cooling mold which is an annealing ring to provide annealed formed glass sheets.
Figure 23:
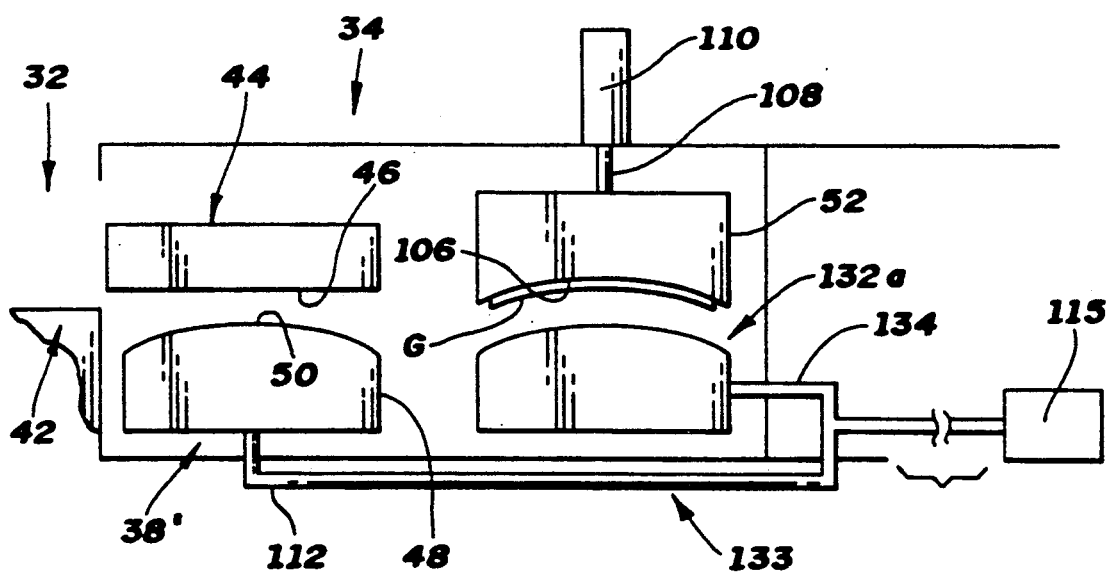
FIG. 23 is a view of another modification wherein the lower vacuum mold and a cooling mold embodied by an annealing ring are moved horizontally by a common actuator.

With reference to FIG. 19, the cooling mold may be embodied by an annealing ring 132a whose peripheral ring 138 has an open center 140 such that the formed glass sheet G is contacted only at the periphery of its lower surface. This annealing ring 132a permits the formed glass sheet to cool at a sufficiently slow rate so as to prevent excessive stresses in the glass sheet upon cooling to ambient temperature such as is necessary in the manufacturing of vehicle windshields from two formed sheets of annealed glass. With the cooling mold embodied by the annealing ring 132a, it is also possible to utilize the modified construction of the forming apparatus 38' illustrated in FIG. 23. This modified construction has a common actuator 115 that moves a shuttle 133 having a connection 112 to the lower vacuum mold 48 and a connection 134 to the annealing ring 132a. This common actuator 115 thus moves both the lower vacuum mold 48 and the annealing ring 132a horizontally for alternate positioning thereof below the upper ring mold 52. When the lower vacuum mold 48 is positioned below the upper ring mold 52, the glass sheet G is formed therebetween as previously described and then transferred to the upper ring mold. When the annealing ring 132a is positioned below upper ring mold 52 as illustrated, the glass sheet G is transferred to the annealing ring prior to subsequent movement of the annealing ring horizontally therefrom for cooling.

Figure 20:
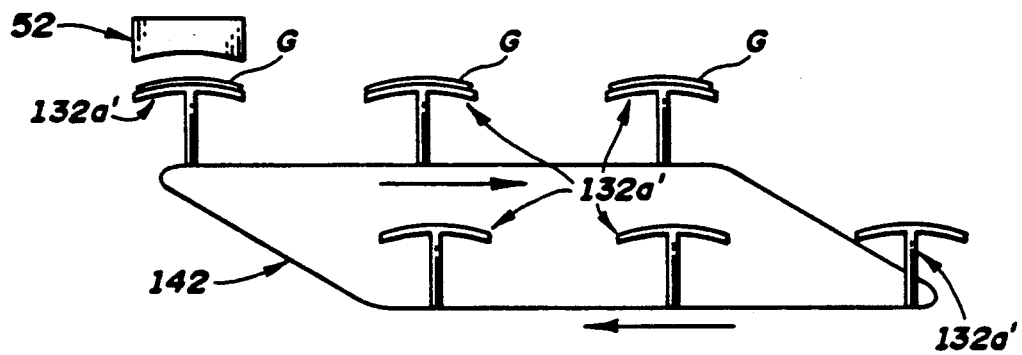
FIG. 20 is a view if a further modification which has a plurality of the annealing rings mounted by a recirculating conveyor.

With reference to FIG. 20, the bending apparatus may also include a plurality of the annealing rings 132a' of the open center ring type and a recirculating conveyor 142 that cyclically moves the annealing rings 132a' to the upper mold to receive each formed glass sheet therefrom during cyclical operation of the apparatus.

Figure 21:
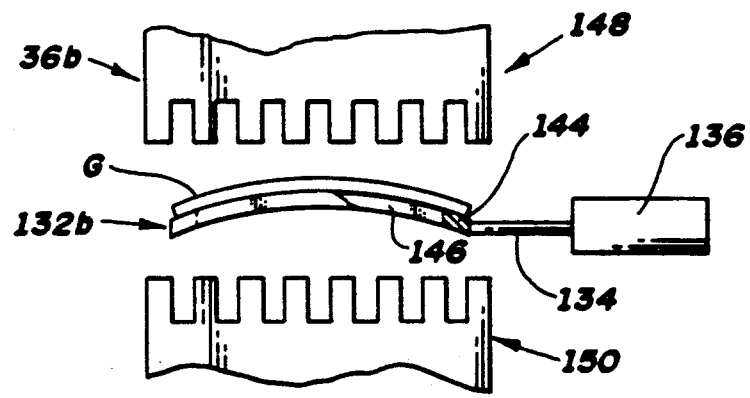
FIG. 21 is a view that illustrates a further embodiment wherein the cooling mold is a quench ring and the apparatus also includes a quench station having upper and lower blastheads between which the quench ring moves the formed glass sheet for rapid cooling that tempers the glass sheet.

With reference to FIG. 21, the cooling mold may also be embodied by a quench ring 132b including a peripheral ring 144 and the cooling station will then be embodied by a quench station 36b having upper and lower blastheads 148 and 150 between which the quench ring under the control of the actuator 136 positions the formed glass sheet G for rapid cooling by quenching gas flow from the blastheads to temper the formed glass sheet.

With the preceding description in mind, the method for forming the flat glass sheet in accordance with the invention involves the initial conveying of the flat glass sheet heated to a sufficiently high temperature to permit forming thereof to a location below the upper topside transfer device 44 with the downwardly facing surface 46. This method proceeds by transferring the heated flat glass sheet to the topside transfer device 44 in its flat condition at the flat surface 46 of the topside transfer device. Movement of the lower vacuum mold 48, which has the upwardly facing full surface 50 with at least a portion thereof having an upwardly convex configuration, to a location below the topside transfer device on which the heated flat glass sheet is supported is then followed by the heated flat glass sheet being released from the topside transfer device onto the lower vacuum mold 48. The upper ring mold 52 then presses the periphery of the glass sheet against the surface 50 of the lower vacuum mold 48 and the vacuum drawn at the lower vacuum mold surface within the sealed periphery of the glass sheet then performs the forming operation.

As previously mentioned, the preferred practice of the method performs the pressing of the periphery of the glass sheet by moving the upper ring mold 52 downwardly toward the lower vacuum mold 48. Furthermore, the method may be performed either with the molds 48 and 52 remaining in a pressing relationship with the glass sheet as the vacuum is drawn at the lower vacuum mold surface 50 to fully form the glass sheet to the shape of the vacuum mold surface or the with the molds 48 and 52 moved away from each other as the vacuum is drawn at the lower vacuum mold surface 50 to fully form the glass sheet to the shape of the vacuum mold surface. Furthermore, the upper ring mold subsequent to the forming of the glass sheet on the lower mold: (a) draws a vacuum to support the formed glass sheet; (b) moves upwardly away from the lower vacuum mold 48; and (c) subsequently releases the formed glass sheet onto the cooling mold 132 for cooling. This release of the glass sheet may be onto a cooling mold that is an annealing ring as described in connection with FIGS. 19 and 20 or a quench ring as described in connection with FIG. 21.

Each of the gas jet pumps 90 and 123 previously described for generating a vacuum utilized in the glass forming operation is most preferably of the type disclosed by U.S. Pat. No. 4,222,763 wherein a primary gas flow is introduced into a passageway through jet openings having axial and circumferential components that are substantially tangent to the inner surface of the passageway such that the primary gas flow induces a secondary gas flow that generates the vacuum through suitable communication with the associated vacuum chamber. With the roller embodiment of the heating conveyor 42b as shown in FIG. 3, it is also possible to provide upward gas flow between the rollers as disclosed by U.S. Pat. No. 4,204,854 McMaster et al in order to assist in transferring the heated flat glass sheet from the heating conveyor to the topside transfer device. The vacuum necessary to support the glass sheet by the upper ring mold is not very large, only about 3 times the thickness of the glass sheet in the height of water column of the vacuum is sufficient.

Figure 9:
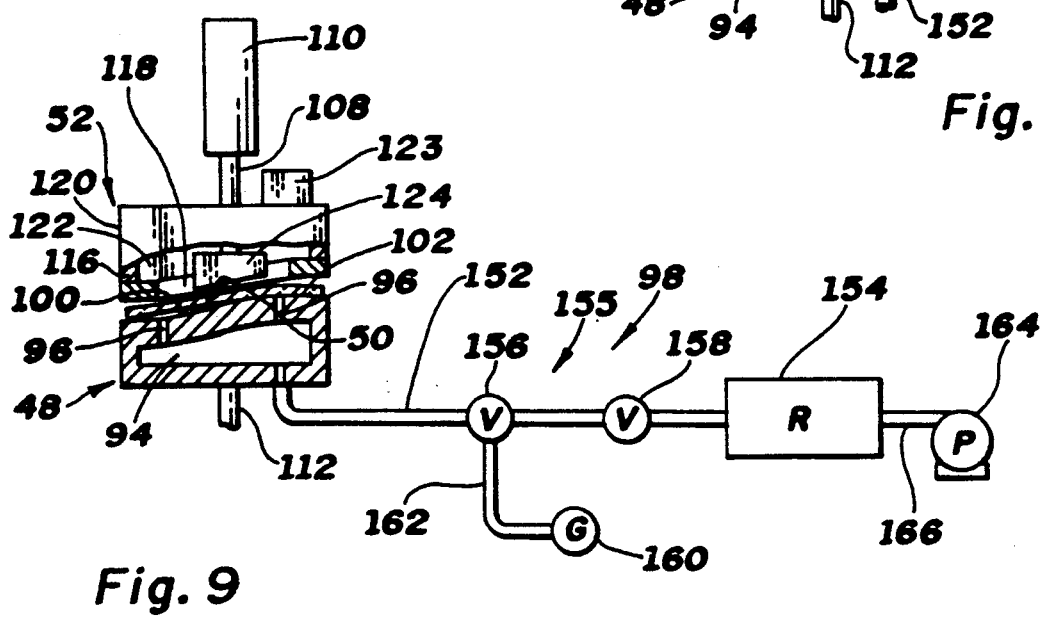
FIG. 9 is a schematic view that illustrates a vacuum system for drawing a vacuum in the lower vacuum mold.

With reference to FIG. 9, the vacuum system 98 utilized to draw the vacuum within the full surface lower vacuum mold 48 in association with the peripheral ring mold 52 includes a conduit 152 that provides a means for communicating the vacuum mold surface 52 within the sealed periphery of the glass sheet with a vacuum reservoir 154 to provide a vacuum impulse that forms the glass sheet to the shape of the mold. This conduit 152 may include a connection that is connected and detached or may be flexible to permit movement of the vacuum mold 48 as previously described and also includes valving 155 shown that controls communication of the vacuum mold 48 and the vacuum reservoir 154 through the conduit. The valving 155 shown includes a first control valve 156 that controls communication of the vacuum mold 48 and the vacuum reservoir 154 through the conduit 152 and also includes a second control valve 158 that controls the area of communication through the conduit between the vacuum mold 48 and the vacuum reservoir 154 to thereby control the vacuum impulse. More specifically, the first valve 156 is initially closed to close the conduit 152 and thereby isolate the vacuum mold 48 from the vacuum reservoir 154. Thereafter, the valve 156 is opened to communicate the vacuum mold 48 with the vacuum reservoir 154 with the second valve 158 in a restricted position that restricts the communication and thereby limits the rate at which the vacuum impulse is initially supplied. Thereafter, the second valve 158 is fully opened to provide a greater area of communication and vacuum impulse to the vacuum mold 48. More specifically, the vacuum system has been successfully operated with an initial vacuum of about 0.1 to 0.3 atmospheres of vacuum for about 0.5 to 2 seconds, and with a second greater vacuum of about 0.25 to 0.7 atmospheres of vacuum for about 0.5 to 6 seconds.

At the completion of the vacuum forming cycle, the valve 156 is operated to terminate the communication of the vacuum mold 48 with the vacuum reservoir 154 and to communicate a pressurized gas source 160 through a conduit 162 with the vacuum mold through the conduit 152 on the mold side of the valve 156. This pressurized gas source 160 supplies pressurized gas to the mold surface 50 to blow the formed glass sheet upwardly against the upper ring mold 52 at which a vacuum is applied as previously described in order to support the formed glass sheet in preparation for the transfer and eventual delivery to the cooling mold. A vacuum pump 164 communicated with the vacuum reservoir 154 through a conduit 166 then draws a vacuum within the vacuum reservoir 154 in preparation for the next cycle. Of course, the extent of the vacuum impulse is controlled by: the size of the vacuum mold chamber 94, the leakage which occurs, the size of the vacuum reservoir 154 and the extent of vacuum drawn within the vacuum reservoir 154 by the vacuum pump 164.

It should be appreciated that the two stages of vacuum applied to the lower vacuum mold 48 can also be achieved with two different vacuum reservoirs that are alternately communicated to the vacuum mold through the use of suitable control valves. After the second stage of vacuum is completed by the second reservoir, the pressurized gas is supplied to the lower vacuum mold to release the glass sheet therefrom and to blow the glass sheet upwardly against the upper ring mold 52.

While the best modes for practicing the invention have been described in detail, other ways of practicing the invention are possible as defined by the following claims.

What is claimed is:

1. Apparatus for forming a flat glass sheet, comprising:
   a heating conveyor for heating the flat glass sheet to a sufficiently high temperature to permit forming thereof;
   an upper topside transfer device having a downwardly facing flat surface for receiving the heated flat glass sheet from the heating conveyor;
   a lower vacuum mold having an upwardly facing full surface with at least a portion thereof having an upwardly convex shape for receiving the heated flat glass sheet from the downwardly facing flat surface of the topside transfer device; and
   an upper ring mold for forming and sealing the periphery of the heated glass sheet against the surface of the lower vacuum mold at which a vacuum is drawn within the sealed periphery of the glass sheet to fully form the glass sheet to the shape of the vacuum mold surface, and the upper ring mold including an enclosure defining a chamber in which a vacuum is drawn to permit the upper ring mold to lift the formed glass sheet upwardly from the lower vacuum mold after the vacuum actuated forming.

2. Apparatus as in claim 1 wherein the heating conveyor is selected from the group consisting of:
   a. a gas hearth conveyor that supports the flat glass sheet on a thin film of gas during the heating; and
   b. a roller conveyor including rollers that rotate to transport and convey the flat glass sheet during the heating.

3. Apparatus as in claim 2 wherein the topside transfer device is selected from the group consisting of:
   a. a gas suspension platen for supporting the heated flat glass sheet received from the heating conveyor by vacuum and pressurized gas without direct engagement therewith; and
   b. a vacuum platen for supporting the heated flat glass sheet received from the conveyor in direct engagement therewith.

4. Apparatus as in claim 1 wherein the upper ring mold includes a shape retention pad located within the vacuum chamber to prevent excessive upward forming of the glass sheet by the vacuum.

5. Apparatus as in claim 1 wherein the upper ring mold has an upper center into which the glass sheet is formed upwardly a controlled extent by the vacuum drawn within the chamber defined by the enclosure of the upper ring mold.

6. Apparatus as in claim 1 further including an actuator for: (a) initially moving the upper ring mold toward the lower vacuum mold to provide the sealing of the periphery of the glass sheet with the vacuum mold surface, and (b) subsequently moving the upper ring mold away from the lower vacuum mold to space the ring mold from the sealed periphery of the glass sheet to permit movement of the glass sheet along the vacuum mold surface during the vacuum actuated forming.

7. Apparatus as in claim 1 further including:
   an actuator that: (a) initially moves the upper ring mold downwardly toward the lower vacuum mold to provide the sealing of the periphery of the glass sheet with the vacuum mold, (b) thereafter moves the upper ring mold upwardly away from the sealed glass sheet on the lower vacuum mold to permit movement of the glass sheet along the surface of the lower vacuum mold during the vacuum actuated forming prior to transferring of the glass sheet from the lower vacuum mold to the upper ring mold for support by a vacuum drawn within the vacuum chamber thereof, and (c) finally moves the upper ring mold upwardly with the formed glass sheet supported thereby so as to be located at an elevation above the lower vacuum mold.

8. Apparatus as in any preceding claim further including a cooling mold for receiving the formed glass sheet for cooling.

9. Apparatus as in claim 8 wherein the cooling mold is an annealing ring that receives the formed glass sheet for cooling at a sufficiently slow rate to prevent excessive stresses in the glass sheet upon cooling to ambient temperature.

10. Apparatus as in claim 9 which includes a common actuator that moves the lower vacuum mold and the annealing ring horizontally for alternate positioning below the upper ring mold.

11. Apparatus as in claim 9 which includes a plurality of the annealing rings and a recirculating conveyor that cyclically moves each of the annealing rings below the upper ring mold to receive a respective formed glass sheet.

12. Apparatus as in claim 8 wherein the cooling mold is a quench ring and further including a quench station including upper and lower blastheads between which the quench ring moves the formed glass sheet for rapid cooling by quenching gas flow from the blastheads to temper the formed glass sheet.

13. Apparatus as in claim 1 further including an actuator for moving the upper ring mold toward the lower vacuum mold to provide the sealing of the periphery of the glass sheet with the mold surface.

14. Apparatus for forming a flat glass sheet, comprising:
   a heating conveyor for heating the flat glass sheet to a sufficiently high temperature to permit forming thereof;
   an upper topside transfer device having a downwardly facing flat surface for receiving the heated flat glass sheet from the heating conveyor;
   a lower vacuum mold having an upwardly facing full surface with at least a portion thereof having an upwardly convex shape for receiving the heated flat glass sheet from the downwardly facing flat surface of the upper topside transfer device, and the lower vacuum mold having openings through which a vacuum is drawn at the full surface thereof to provide forming of the glass sheet;
   an upper ring mold including an enclosure for defining a vacuum chamber;
   an actuator for moving the upper ring mold downwardly to form and seal the periphery of the glass sheet against the surface of the lower vacuum mold at which a vacuum is drawn within the sealed periphery of the glass sheet to form the entire extent of the glass sheet to the shape of the lower vacuum mold surface, a vacuum then being provided within the vacuum chamber of the upper ring mold to support the formed glass sheet on the ring mold, and the actuator thereafter moving the upper ring mold and the formed glass sheet upwardly to a vertical elevation above the lower vacuum mold; and a cooling mold for receiving the formed glass sheet from the upper ring mold for cooling.

15. Apparatus for forming a flat glass sheet, comprising:

a heating conveyor for heating the flat glass sheet to a sufficiently high temperature to permit forming thereof, and the heating conveyor being selected from the group consisting of:

a. a gas hearth conveyor that supports the flat glass sheet on a thin film of gas during the heating, and b. a roller conveyor including rollers that rotate to transport and convey the flat glass sheet during the heating;

an upper topside transfer device having downwardly facing flat surface for receiving the heated flat glass sheet from the heating conveyor, and the topside transfer device being selected from the group consisting of:

a. a gas suspension platen for supporting the heated flat glass sheet received from the conveyor without direct engagement therewith, and b. a vacuum platen for supporting the heated flat glass sheet received from the conveyor in direct engagement therewith;

a lower vacuum mold having an upwardly facing full surface with at least a portion thereof having an upwardly convex shape for receiving the heated flat glass sheet from the downwardly facing flat surface of the upper topside transfer device, and the lower vacuum mold having openings through which a vacuum is drawn at the full surface thereof to provide forming of the glass sheet;

an upper ring mold including an enclosure for defining a vacuum chamber and also including a shape retention pad;

an actuator for moving the upper ring mold downwardly to form and seal the periphery of the glass sheet against the surface of the lower vacuum mold at which a vacuum is drawn within the sealed periphery of the glass sheet to form the entire extent of the glass sheet to the shape of the lower vacuum mold surface, a vacuum then being provided within the vacuum chamber of the upper ring mold to support the formed glass sheet on the ring mold and the shape retention pad preventing undesired forming of the glass sheet by the vacuum drawn within the vacuum chamber of the ring mold, and the actuator thereafter moving the upper ring mold and the formed glass sheet upwardly to a vertical elevation above the lower vacuum mold; and a cooling mold for receiving the formed glass sheet from the upper ring mold for cooling.

16. A method for forming a flat glass sheet, comprising:

heating the flat glass sheet to a sufficiently high temperature for forming;

transferring the heated flat glass sheet to a downwardly facing surface of a topside transfer device;

releasing the heated flat glass sheet from the topside transfer device onto a full surface of a lower vacuum mold having at least a portion with an upwardly convex shape;

thereafter pressing the glass sheet between the lower vacuum mold and an upper ring mold to form and seal the periphery of the glass sheet against the lower vacuum mold surface;

drawing a vacuum at the vacuum mold surface within the sealed periphery of the glass sheet to form the entire extent of the glass sheet to the shape of the vacuum mold surface; and finally drawing a vacuum within an enclosure of the upper ring mold such that the upper ring mold receives and delivers the formed glass sheet from the vacuum mold for cooling.

17. The method of claim 16 wherein the upper ring mold is moved downwardly to press the glass sheet between the molds.

18. The method of claim 16 wherein the molds remain in a pressing relationship with the glass sheet as the vacuum is drawn at the lower vacuum mold surface to fully form the glass sheet to the shape of the vacuum mold surface.

19. The method of claim 16 wherein the molds are moved away from each other as the vacuum is drawn at the lower vacuum mold surface to fully form the glass sheet to the shape of the vacuum mold surface.

20. The method of claim 16, 17, 18 or 19 wherein subsequent to the vacuum forming of the glass sheet on the lower vacuum mold, the upper ring mold moves upwardly away from the lower vacuum mold; and subsequently releases the formed glass sheet onto a cooling mold for cooling.

21. The method of claim 20 wherein the formed glass sheet is released onto a cooling mold selected from the group consisting of an annealing ring and a quench ring.

* * * * *

UNITED STATES PATENT AND TRADEMARK OFFICE
CERTIFICATE OF CORRECTION

PATENT NO.   :   5,004,491
DATED        :   April 2, 1991
INVENTOR(S)  :   Ronald A. McMaster et al.

It is certified that error appears in the above-identified patent and that said Letters Patent is hereby corrected as shown below:

ON THE TITLE PAGE:

References Cited, "3,782,916  1/1980  Powell et al." should be --3,782,916  1/1974  Powell et al.--.

Column 5, Line 51
"if" should be --of--.

Column 7, Line 62
after "After" insert --the lifting operation, the actuator 88 moves the vacuum platen 44b--.

Column 11, Line 8
"!36" should be --136--.

Column 11, Line 41
after "or" and before "with" delete "the".

Signed and Sealed this

Thirteenth Day of October, 1992

Attest:

DOUGLAS B. COMER

*Attesting Officer*     Acting Commissioner of Patents and Trademarks